United States Patent
Fukumoto et al.

(10) Patent No.: US 7,206,102 B2
(45) Date of Patent: Apr. 17, 2007

(54) IMAGE READING APPARATUS WITH PARTIALLY SHIELDED LIGHT-RECEIVING ELEMENTS

(75) Inventors: Hiroshi Fukumoto, Kyoto (JP); Mitsuhiko Fukuda, Kyoto (JP)

(73) Assignee: Rohm co., Ltd., Kyoto (JP)

( * ) Notice: Subject to any disclaimer, the term of this patent is extended or adjusted under 35 U.S.C. 154(b) by 657 days.

(21) Appl. No.: 09/865,691

(22) Filed: May 29, 2001

(65) Prior Publication Data
US 2002/0051239 A1    May 2, 2002

(30) Foreign Application Priority Data
May 29, 2000    (JP)    ............................. 2000-157621

(51) Int. Cl.
H04N 1/40 (2006.01)
H04N 1/00 (2006.01)
H04N 1/38 (2006.01)
H04N 1/04 (2006.01)
H01L 27/00 (2006.01)

(52) U.S. Cl. ...................... 358/461; 358/464; 358/509; 250/208.1

(58) Field of Classification Search ................ 358/461, 358/474, 483, 406, 464, 509, 511; 382/274; 250/208.1; 348/311
See application file for complete search history.

(56) References Cited

U.S. PATENT DOCUMENTS

| 4,293,877 | A | * | 10/1981 | Tsunekawa et al. ......... 348/316 |
| 4,567,527 | A | * | 1/1986 | Yokomizo ................... 358/461 |
| 4,974,098 | A | * | 11/1990 | Miyakawa et al. ......... 358/406 |
| 5,521,639 | A | * | 5/1996 | Tomura et al. ............. 348/243 |
| 5,612,739 | A | * | 3/1997 | Maki et al. ................. 348/311 |
| 5,786,582 | A | * | 7/1998 | Roustaei et al. ........ 235/462.07 |
| 6,055,072 | A | * | 4/2000 | Tabata et al. ............... 358/509 |
| 6,166,832 | A | | 12/2000 | Fujimoto .................... 358/484 |
| 6,627,896 | B1 | * | 9/2003 | Hashimoto et al. ..... 250/370.11 |
| 6,717,734 | B2 | * | 4/2004 | Fujimoto .................... 359/619 |
| 6,900,837 | B2 | * | 5/2005 | Muramatsu et al. ........ 348/243 |
| 2001/0055409 | A1 | * | 12/2001 | Shiratsuchi et al. ........ 382/101 |

* cited by examiner

*Primary Examiner*—Jerome Grant
*Assistant Examiner*—Houshang Safaipour
(74) *Attorney, Agent, or Firm*—Michael Bednarek; Paul, Hastings, Janofsky & Walker LLP

(57) ABSTRACT

An image reading apparatus includes a plurality of light-receiving elements, a lens array, and a light-shielding member. All of the light-receiving elements are arranged in a single line having an extremity. The light-shielding member covers one or more light-receiving elements disposed at the extremity.

9 Claims, 4 Drawing Sheets

IMAGE READING APPARATUS WITH PARTIALLY SHIELDED LIGHT-RECEIVING ELEMENTS

BACKGROUND OF THE INVENTION

1. Field of the Invention

The present invention relates to an image reading apparatus.

2. Description of the Related Art

As is known in the art, a typical image reading apparatus (or scanner) includes a light source for illuminating a document to be read out, and an array of light-receiving elements for detecting the light reflected on the document.

An image scanner is preferably provided with a "black level adjustment" function so that the output level of image reading signals can be adjusted. Specifically, it is known that the sensitivity of a light-receiving element (semiconductor device) tends to be varied under the influence of the temperature of the surrounding air. Thus, without taking any countermeasures, the level of an image reading signal outputted from a light-receiving element may unduly fluctuate during an image reading process. To eliminate this unfavorable fluctuation, the black level adjustment is performed in the following manner.

FIG. 4 of the accompanying drawings shows light-sensing IC chips 9 arranged side by side to detect the light reflected on a document to be read. (It should be noted here that the illustrated chips 9 are mere comparative examples for better understanding of the present invention, and that they should not be regarded as the prior art.) Each of the IC chips 9 includes an array of primary light-receiving elements 90 and one secondary (or "dummy") light-receiving element 91. The dummy element 91 is covered with an aluminum film for shielding light.

Due to the aluminum covering, the level of a signal outputted from the dummy element 91 corresponds to the level of a signal obtained when reading out a black object. When the level of a signal from the dummy element 91 is unequal to the predetermined value ("zero" for example), it is shown that the current image reading condition is inappropriate (that is, the sensitivity of each light-receiving element is unduly altered due to the temperature of the surrounding air). In this case, the sensitivity of each light-receiving element needs to be adjusted for a proper image reading operation.

Though the IC chips 9 of FIG. 4 are arranged to perform the black level adjustment, they are disadvantageous in the following respects.

First, in each IC chip 9, a dummy light-receiving element 91 needs to be provided additionally to the primary elements 90 performing actual image reading. Unfavorably, this structure renders the fabrication of the IC chip 9 rather complicated, thereby resulting in an increase in production cost.

Second, the IC chip 9 needs room for provision of the dummy element 91. Thus, the width La of the chip 9 tends to become rather large.

Third, the chip 9 is different in design, due to the dummy element 91, from a light-sensing IC chip having no such dummy element. Thus, the manufacturer may need to fabricate two (or more) types of light-sensing IC chips to meet design requirements in different applications. Disadvantageously, this causes a production cost increase.

SUMMARY OF THE INVENTION

The present invention has been proposed under the circumstances described above. It is, therefore, an object of the present invention to provide an image reading apparatus incorporating such an advantageously small and inexpensive light-sensing IC chip with a black level adjustment-compatible design.

According to the present invention, there is provided an image reading apparatus which includes: a plurality of light-receiving elements that output image signals corresponding to received light; a plurality of lenses that focus light onto the light-receiving elements; and a light-shielding member. In this apparatus, all of the light-receiving elements are arranged in a single line having an extremity, wherein the light-shielding member covers at least one light-receiving element disposed at the extremity.

Preferably, the remaining light-receiving elements other than the covered light-receiving element or elements are exposed to the exterior.

Preferably, the covered light-receiving element is arranged to avoid direct facing to an object to be read out.

Preferably, the light-shielding member is a metal layer or nonmetal layer. The nonmetal layer may be made of a paint material.

Preferably, the light-shielding member is black.

Preferably, the image reading apparatus of the present invention may further include a semiconductor chip in which the plurality of light-receiving elements are built in.

Preferably, the light-shielding member covers a part of the semiconductor chip in addition to the above-mentioned one light-receiving element disposed at the extremity.

Preferably, the image reading apparatus of the present invention may further include an additional semiconductor chip in which a plurality of identical light-receiving elements are built in, wherein all of the identical light-receiving elements are exposed to the exterior.

Other features and advantages of the present invention will become apparent from the detailed description given below with reference to the accompanying drawings.

DETAILED DESCRIPTION OF THE PREFERRED EMBODIMENTS

The preferred embodiments of the present invention will be described below with reference to the accompanying drawings.

Figure 1:
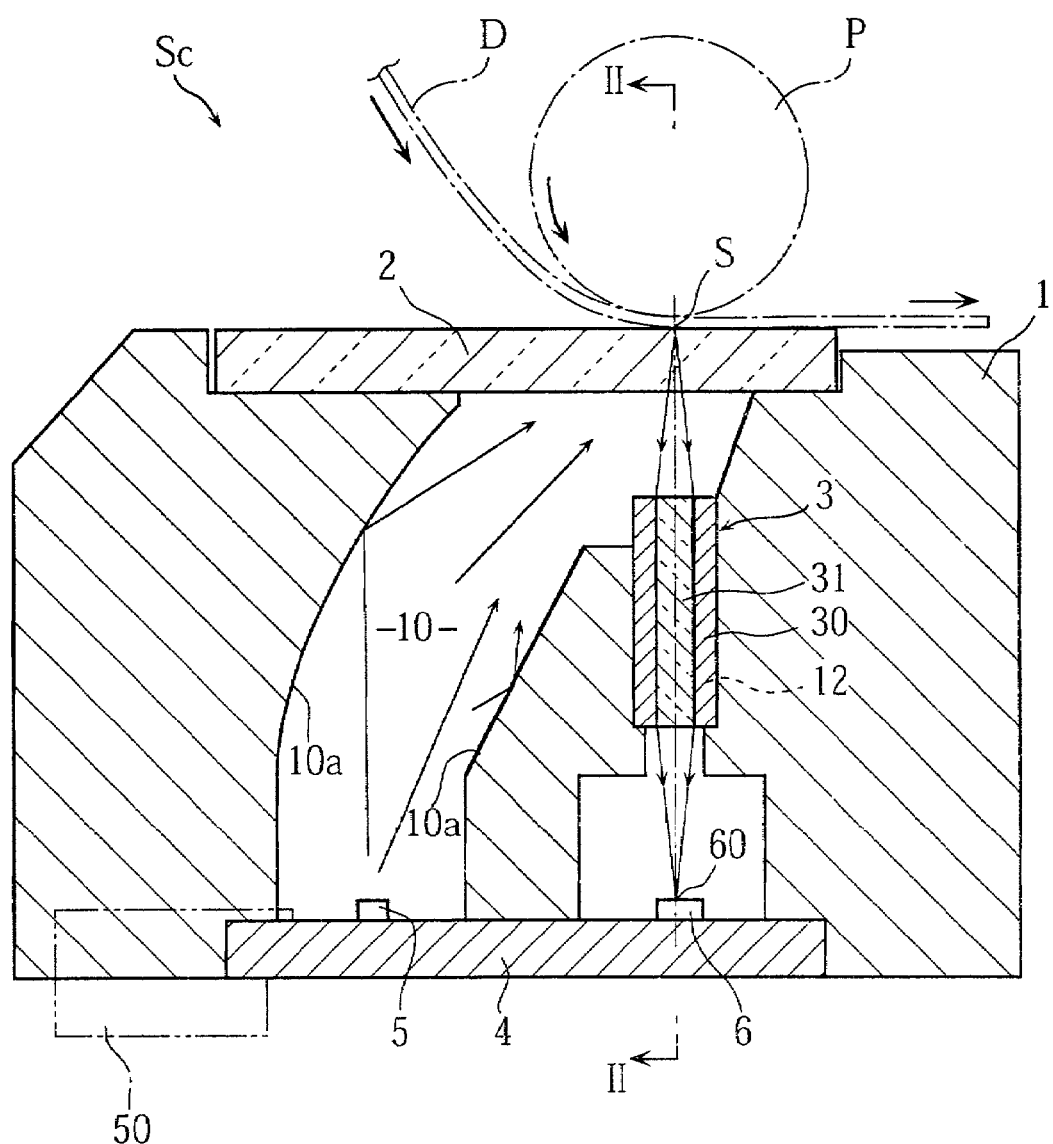
FIG. 1 is a sectional view showing an image reading apparatus embodying the present invention.

FIG. 1 shows, in section, an image reading apparatus Sc (simply called "scanner" hereinafter) according to a preferred embodiment of the present invention. The scanner Sc includes a housing 1, a transparent cover 2, a lens array 3, an insulating substrate 4, a plurality of LEDs (light-emitting diodes) 5, and a plurality of light-sensing IC (integrated circuit) chips 6. Each of the IC chips 6 includes a plurality of built-in light-receiving elements 60.

Figure 2:
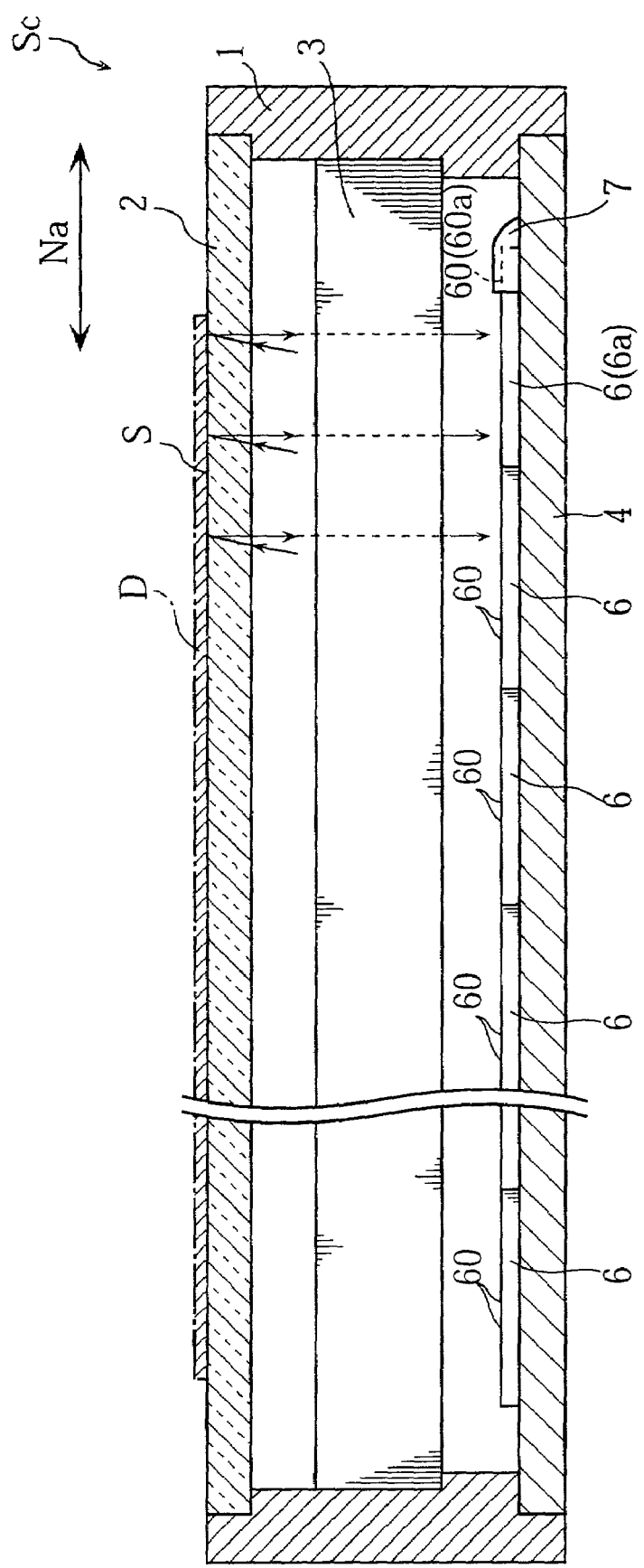
FIG. 2 is a sectional view taken along lines II—II in FIG. 1.

The housing 1 may be made of a synthetic resin material and, as shown in FIG. 2, has an elongated configuration in the primary scanning direction shown by two-headed arrow Na. The housing 1 is formed with a light-conducting opening 10 extending in the longitudinal direction Na. As shown in FIG. 1, the opening 10 extends through the vertical thickness of the housing 1 so that the light emitted from each LED 5 is properly conducted to the image reading region S on the transparent cover 2. The image reading region S is a line region extending in the primary scanning direction Na.

The transparent cover 2 is a rectangular plate made of synthetic resin (such as acrylic resin) or glass. The cover 2 is fixed to the upper surface portion of the housing 1 to close the uppermost part of the opening 10. As shown in FIG. 1, a platen roller P is held in facing relation to the cover 2. Held in slidable contact with the cover 2, a document D is forwarded in the secondary scanning direction by the platen roller P.

The lens array 3 includes an array of focusing lenses 31 (only one is shown in FIG. 1) held together by an elongated holder 30 made of synthetic resin. Preferably, each of the lenses 31 may be a self-focusing lens configured to project the full-scale image of the original in a non-inverted manner. However, the present invention is not limited to this, and each lens 31 may be an ordinary convex lens or other kinds of lenses. As shown in FIG. 1, the lens array 3 is fitted into a positioning groove 12 formed within the housing 1. Properly put into place, the lens array 3 is located exactly below the image reading region S.

Figure 3:
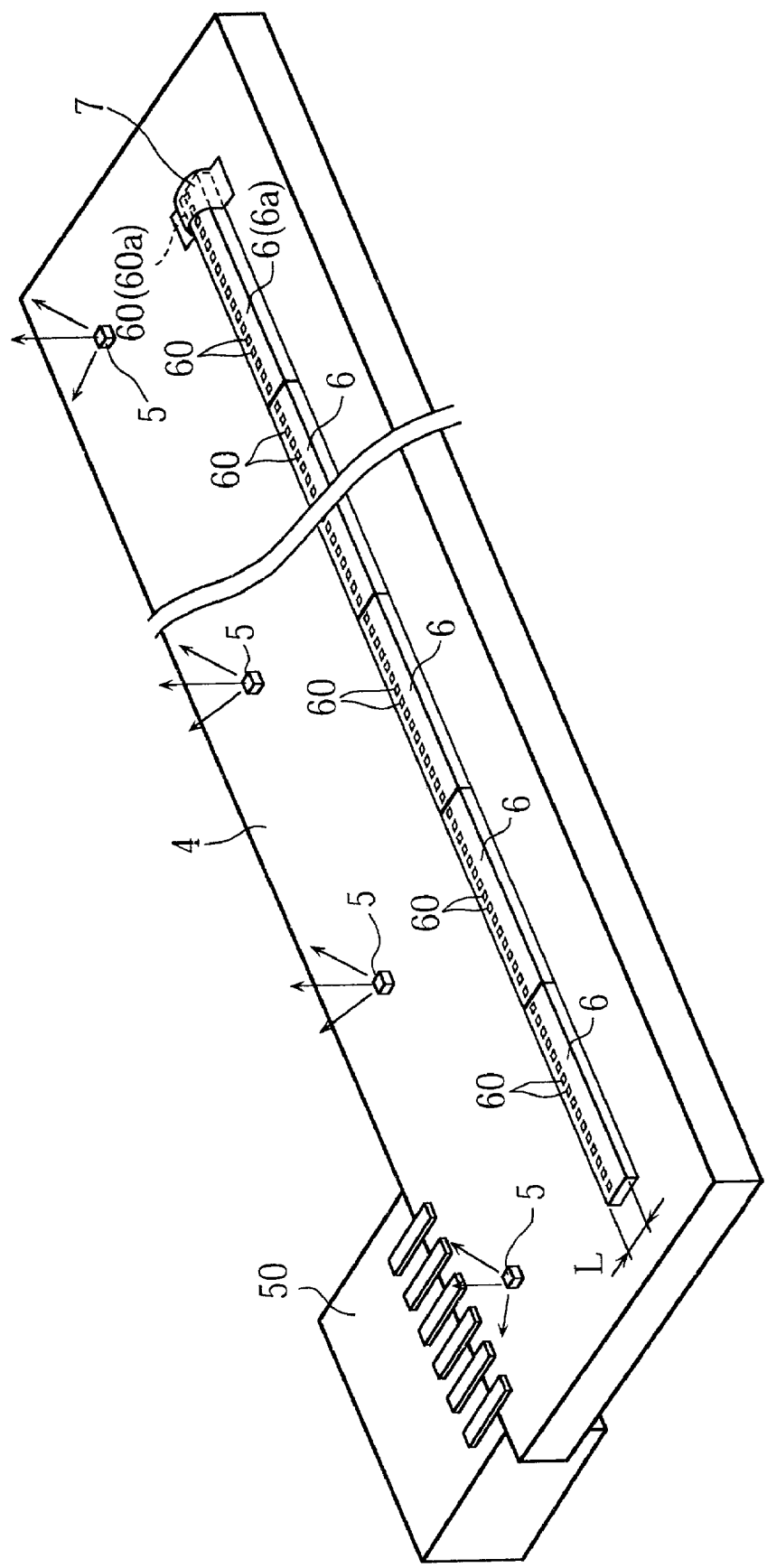
FIG. 3 is a perspective view showing the insulating substrate incorporated in the image reading apparatus of FIG. 1.

As best shown in FIG. 3, each of the IC chips 6 has a rectangular configuration, along which the light-receiving elements 60 are disposed at regular intervals. Each light-receiving element 60, having a photoelectric function, outputs an image signal the level of which corresponds to the received light. The IC chips 6 are mounted on the upper surface of the substrate 4, to be disposed in a line extending longitudinally of the substrate. As shown in FIG. 1, the IC chips 6 are located below the lens array 3 when the substrate 4 is fixed to the bottom of the housing 1.

As shown in FIGS. 2 and 3, some of the light-receiving elements 60 of the rightmost IC chip 6 (6a) are covered by a light-shielding member 7. In the illustrated example, the shielding member 7 is provided at the right end of the rightmost IC chip 6a. The shielding member 7 is dark-colored (preferably pitch-black). The shielding member 7 may be made by applying dark-colored paint to the prescribed portions of the relevant components. Such a paint-applying technique is advantageously easy to perform. Alternatively, the light-shielding member 7 may be made of metal or nonmetal film or layer unpermeable to light. The shielding member 7 may cover only one light-receiving element 6.

The LEDs 5 illuminate the document D at the image reading region S. As shown in FIG. 3, the LEDs 5 are disposed at regular intervals in the longitudinal direction of the substrate 4. When the substrate 4 is fixed to the housing 1, as shown in FIG. 1, the LEDs 5 are accommodated in the light-conducting opening 10. The wall surfaces 10a of the opening 10 are rendered white so that light is reflected on the wall surfaces with high reflectivity. Accordingly, the light emitted from each LED 5 will be efficiently conducted to the image reading region S as being reflected on the wall surfaces 10a. According to the present invention, a transparent light conductor may be provided in the opening 10 to conduct light from the LEDs 5 to the image reading region S.

The substrate 4 may be made of ceramic material or epoxy resin. The substrate 4 supports a connector 50 which is connected to the LEDs 5 and the IC chips 6 via a wiring pattern (not shown) formed on the substrate 4. The connector 50 serves as an intermediary between an external power supply or signal supply and the LEDs 5 or IC chips 6.

The operation of the scanner Sc will now be described.

Referring to FIG. 1, to begin an image reading process for the document D, first the LEDs 5 are turned on to illuminate the image reading region S. The light reflected on the document D at the region S is focused by the lens array 3 onto the light-receiving elements 60. Then, the respective light-receiving elements 60 output an image reading signal corresponding to the received light.

As shown in FIG. 2, the shielded elements 60a are situated at the right extremity of the array of the IC chips 6, so that they do not face any part of the document D. On the other hand, the remaining (i.e., exposed) light-receiving elements 60 are arranged to cover the whole width of the document D. Thus, the light reflected on the document D is properly picked up by the remaining elements 60.

Since no light enters the shielded elements 60a, these particular elements 60a output a signal ("black signal") corresponding to the one which the unshielded elements 60 will supply in reading out a black object. By using this black signal as a reference signal, the black level adjustment is performed with respect to the uncovered light-receiving elements 60. Specifically, the sensitivity of the light-receiving elements 60 are adjusted based on the black signal. In this manner, it is possible to obtain proper image reading signals whose output level corresponds exactly to the shading and tint of the original.

Figure 4:
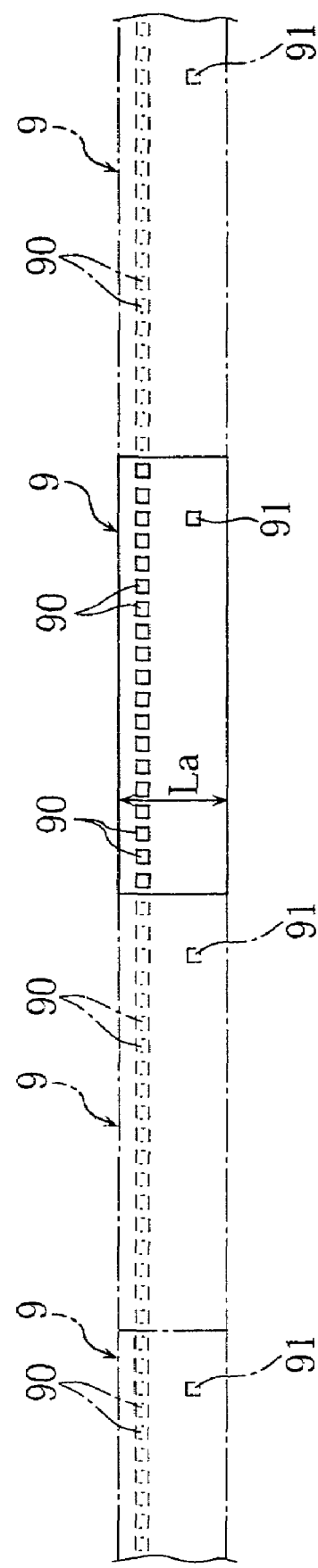
FIG. 4 is a plan view showing light-sensing IC chips as a comparative example.

In the above-described scanner Sc, each light-sensing IC chip 6 does not need an additional "dummy" light-receiving element prepared exclusively for performing black level adjustment. With such a simple structure, the IC chip 6 can be fabricated more easily than the comparative IC chip 9 shown in FIG. 4. Also, the width L (see FIG. 3) of each IC chip 6 can be smaller than that of the comparative IC chip 9.

According to the present invention, the LEDs 5 as a light source may be replaced by a cold-cathode tube. The light source (LEDs, cold-cathode tubes, etc.) may be prepared as a separate unit from the main body of the scanner. Further, the scanner of the present invention may not be provided with a platen roller. In this instance, the scanner may be of the hand-held type or of the flat bed type in which a document is kept stationary relative to the document-supporting plate.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

the invention claimed is:

1. An image reading apparatus comprising:
    a transparent cover for providing a linear image reading region that has a first length;
    a light source for generating light directed toward the linear image reading region on the transparent cover;
    a plurality of light-receiving elements that output image signals corresponding to received light;
    an array of lenses that focuses light onto the light-receiving elements, the array of lenses having a second length that is greater than the first length; and
    a light-shielding member;

wherein all of the light-receiving elements are arranged in a single line having a first extremity and a second extremity, the first extremity extending beyond the first length of the image reading region by a first amount, the second extremity extending beyond the first length of the image reading region by a second amount which is smaller than the first amount, the light-shielding member covering at least one light-receiving element disposed at the first extremity outside the first length of the linear reading region but inside the second length of the lens array.

2. The apparatus according to claim 1, wherein remaining light-receiving elements other than the covered light-receiving element or elements are exposed.

3. The apparatus according to claim 1, wherein the covered light-receiving element is arranged to avoid direct facing to an object to be read out.

4. The apparatus according to claim 1, wherein the light-shielding member comprises one of a metal layer and a nonmetal layer.

5. The apparatus according to claim 4, wherein the nonmetal layer is made of a paint material.

6. The apparatus according to claim 1, wherein the light-shielding member is black.

7. The apparatus according to claim 1, further comprising a semiconductor chip in which the plurality of light-receiving elements are built in.

8. The apparatus according to claim 7, wherein the light-shielding member covers a part of the semiconductor chip in addition to said one light-receiving element disposed at the first extremity.

9. The apparatus according to claim 7, further comprising an additional semiconductor chip in which a plurality of identical light-receiving elements are built in, wherein all of the identical light-receiving elements are exposed.

* * * * *